March 3, 1970     A. C. WRIGHT     3,498,173
ANTI-TAMPERING FASTENER
Filed Dec. 9, 1968
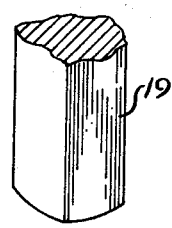
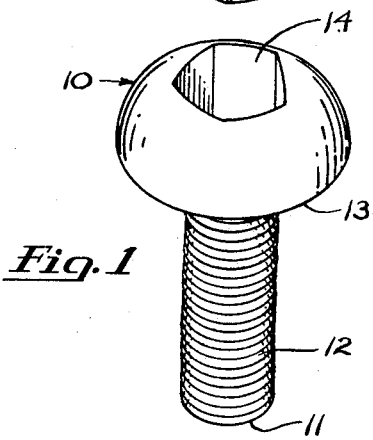
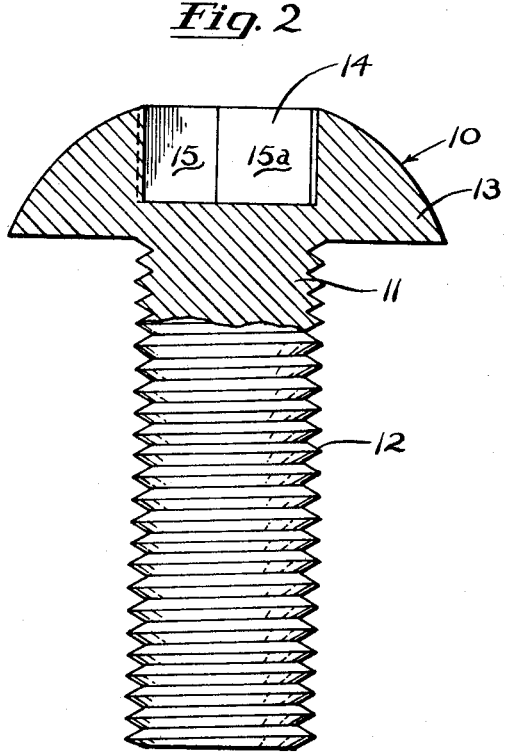
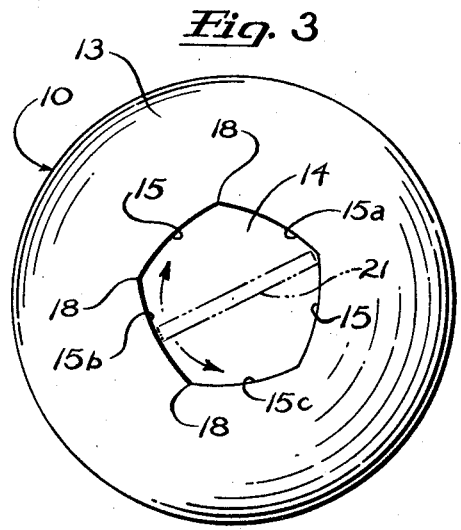
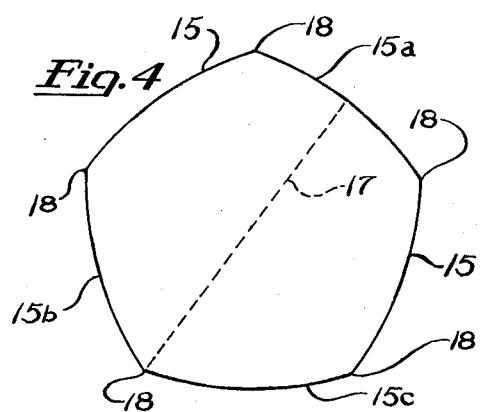
INVENTOR.
Allen C. Wright
BY
Gardner & Zimmerman
Attorneys United States Patent Office 3,498,173
Patented Mar. 3, 1970

3,498,173
ANTI-TAMPERING FASTENER
Allen C. Wright, Moraga, Calif., assignor to Haws Drinking Faucet Company, Berkeley, Calif., a corporation of California
Filed Dec. 9, 1968, Ser. No. 782,225
Int. Cl. B25b 15/00; F16b 23/00
U.S. Cl. 85—45                                          5 Claims

ABSTRACT OF THE DISCLOSURE

A screw fastener having tamper-proof characteristics requiring use of a special screw-driving implement to effect its rotation. The fastener has a threaded shank and a round or button head at an end of the shank, such head being provided with a tool-receiving opening of generally equilateral pentagonal configuration (in plan view) with each of the sides thereof defining a circular arc having its origin at the junction of the sides opposing the side having such origin.

---

This invention relates to fasteners and more particularly, to fasteners such as screws and bolts having a tool-receiving opening in the head thereof and to a tool receivable within such opening to effect rotation of the fastener.

As is well known, screw-type fasteners are used in great numbers, and in the usual instance, once they are secured in position, there is ordinarily little danger of their being intentionally released by other than authorized personnel. There are, however, some environments, especially areas and locations open to the general public, in which unauthorized persons (children and vandals, for example) are tempted to release and remove screw-type fasteners thereby leading to damage, theft or other loss of the equipment with which the screw fasteners are used. It is thus advantageous to provide tamper-proof fasteners for use in such environments so to prevent the fasteners from being released or removed except by authorized personnel.

An object of the invention is to provide a screw or bolt in which the recess or opening provided in the head of the screw and designed to receive the tip of a screw driver for effecting rotation of the screw is of a form such that a conventional screw driver or similar tool when positioned in the opening cannot be made to engage the walls thereof to apply leverage for effecting rotation of the screw.

Another object of the invention is to provide an opening in the head of the screw for receiving a tool for effecting rotation of the screw, which is of form which will require the use of a special tool to be inserted in the opening for effecting rotation of the screw and that in the event a conventional screw driver is inserted in the opening for rotating the screw, the screw driver when rotated will rotate freely in the opening without any accompanying movement of the screw.

Broadly, the invention comprises a fastener having a threaded shank and a tool-receiving opening which is essentially defined by a series of transversely arcuate concave sides, each of which has its origin (center of curvature) substantially on the periphery of the opening between adjacent sides opposite the side having the origin. As will become clear from the following description of the preferred embodiment, only a special tool is able to coact with the sides of such an opening in a manner effecting rotation of the fastener. The head of the fastener also has a form preventing application of a wrench or pliers for gripping the wrench to rotate the screw, thus rendering the screw substantially tamper-proof insofar as utilization of conventional tools to effect rotation of the screw.

Additional objects and advantages of the invention, especially as concerns particular features and characteristics thereof, will become apparent as the specification develops.

An embodiment of the invention is illustrated in the accompanying drawing, in which:

FIGURE 1 is a perspective view of a screw fastener embodying the invention and of a portion of a screwdriver for use therewith;

FIGURE 2 is an enlarged, longitudinal sectional view through the screw fastener;

FIGURE 3 is a top plan view thereof; and

FIGURE 4 is a diagrammatic view illustrating structural characteristics of the tool-receiving opening in the fastener.

The present invention may be incorporated in practically all types and designs of screws, bolts, and generally similar fasteners of customary or special design, and as depicted in the drawing the invention is shown applied to a screw type fastener 10 provided with an exteriorly threaded shank 12. At one end of the shank is a head 13, and preferably the head is enlarged in respect to the shank so as to readily accommodate a relatively large sized opening or socket 14 in the head. The opening 14 is designed to receive a tool to engage the sides of the opening for rotating the fastener and is of particular configuration so as to make it exceedingly difficult if not virtually impossible, to rotate the fastener by means of a tool inserted in the opening unless such tool corresponds very closely to the precise configuration of the opening.

The open side of the socket or opening 14 is at the top of the head (as viewed in FIGURES 1 and 3) and is provided with a plurality of sides 15 extending vertically in generally parallel relation to the longitudinal axis of the shank. The sides 15 are contiguous or practically so at their ends in the transverse section of the shank and are of an odd number, desirably 3, 5, or 7. In the drawings, the opening is shown with five sides, and all sides are equal in length. It will be noted that with such a five sided arrangement, the distance between alternate junctions of the sides is substantially the same as the radius of curvature of each side.

Each side 15 is arcuate in transverse section with the concave surface facing the opening, and as will be clear from FIGURE 4, the origin for each of such arcuate sides is located at or closely adjacent the junction of the two sides opposing the side having such origin. For example, the origin for the arc or side 15a is positioned at the junction of the sides 15b and 15c. As will also be clear from FIGURE 4, the radius 17 which extends from the point of origin of each arc to the midway point between the ends of the arc passes through the general center of the opening.

With the opening 14 thus formed, the greatest width across the opening is the length of the radius 17. Thus, if an ordinary screw driver such as shown in dotted lines at 21 in FIGURE 2 of the drawing, say of a width substantially equal to the greatest width of the opening or, in other words, equal to the length of the radius 17, is inserted in the opening with one of its side edges placed in one of the corners or apexes 18 at the junction of any two sides 15, the other side edge of the screw driver will simply move along the arcuate surface opposite said corner, which surface of course has its origin at said corner. When the last mentioned edge of the screw driver reaches the end of said curved surface and contacts the adjoining curved side, the first mentioned edge of the driver will be moved out of the corner and caused to move along the curved surface of the adjoining side of the opening having its origin at the corner engaged by the second mentioned edge of the driver. It will thus be clear that any rotation of the driver in the opening will at all times be free and will not result in any rotation of the fastener. The same result will occur regardless of the size of the driver.

The head 13 of the fastener has an exterior surface configuration preventing use of the same for rotation of the fastener. That is, the exterior surface of the head is free of projections and other depressions enabling a grip to be obtained on the head. In this connection, the head is in the form of a section of a sphere with the shank 12 projecting from the base of the section and the tool-receiving opening in the surface of the section opposite to the base.

As will now be evident, in order to effect rotation of the screw, the driver will have to have a special bit which can be readily inserted in the opening and engage the walls of the opening so that when the driver is rotated the fastener will be caused to rotate with it. For this purpose, it has been found effective to provide a screw driver such as indicated at 19 in the drawing having a bit of substantially the same shape as, and of a size slightly smaller than, the opening. With the use of a bit of this form, each side thereof when engaged in the opening, will make contact with the opposing side of the opening so that when the driver is rotated either in one direction or the other, the fastener will be forced to rotate with the driver and thus move the fastener into or out of desired position.

I claim:

1. A fastener having a threaded shank provided with a tool-receiving opening in an end thereof defined essentially by an odd number of transversely arcuate concave sides and defined by substantially equal radii, each such side having the origin of the radius of curvature thereof substantially on the periphery of the opening between the junction of adjacent sides opposite the side having said origin, each of the junctions between adjacent sides defining an obtuse angle.

2. The fastener of claim 1 in which the sides are five in number and the distance between alternate junctions of the sides is substantially the same as the radius of curvature of each side.

3. The fastener of claim 1 in combination therewith of a screw-driver which substantially corresponds in cross-section with that of the tool-receiving opening and being snugly receivable therein so as to rotate the fastener to tighten or release the same.

4. The fastener of claim 1 wherein said fastener is provided with an enlarged head at said end of said shank, said tool-receiving opening being formed in said head and the exterior surfaces of said head being otherwise free of projections and depressions enabling a grip on said head for rotation of said fastener.

5. The fastener of claim 4 wherein said head is in the form of a section of a sphere with said shank projecting from the base of said section and said tool-receiving opening being defined in the surface of said section opposite to said base.

References Cited
UNITED STATES PATENTS

| 2,248,695 | 7/1941 | Bradshaw | 85—45 |
| 2,467,908 | 4/1949 | Rand | 85—45 X |

FOREIGN PATENTS

| 1,499,117 | 9/1967 | France. |
| 556,145 | 9/1943 | Great Britain. |

RAMON S. BRITTS, Primary Examiner

U.S. Cl. X.R

145—50